(12) United States Patent
Yoo (10) Patent No.: US 8,925,068 B2
(45) Date of Patent: Dec. 30, 2014

(54) METHOD FOR PREVENTING DENIAL OF SERVICE ATTACKS USING TRANSMISSION CONTROL PROTOCOL STATE TRANSITION

(75) Inventor: In Seon Yoo, Seongnam-si (KR)

(73) Assignee: Samsung SDS Co., Ltd., Seoul (KR)

( * ) Notice: Subject to any disclaimer, the term of this patent is extended or adjusted under 35 U.S.C. 154(b) by 1221 days.

(21) Appl. No.: 12/514,697

(22) PCT Filed: Dec. 8, 2006

(86) PCT No.: PCT/KR2006/005337
§ 371 (c)(1),
(2), (4) Date: Nov. 2, 2009

(87) PCT Pub. No.: WO2008/060009
PCT Pub. Date: May 22, 2008

(65) Prior Publication Data
US 2010/0088763 A1    Apr. 8, 2010

(30) Foreign Application Priority Data

Nov. 13, 2006 (KR) .................. 10-2006-0111606

(51) Int. Cl.
*G06F 21/00* (2013.01)
*H04L 29/06* (2006.01)

(52) U.S. Cl.
CPC .................. *H04L 63/1458* (2013.01)
USPC ............... 726/13; 726/22; 709/224

(58) Field of Classification Search
None
See application file for complete search history.

(56) References Cited

U.S. PATENT DOCUMENTS

| 5,978,849 | A * | 11/1999 | Khanna ................. 709/227 |
| 6,725,378 | B1 * | 4/2004 | Schuba et al. .......... 726/13 |
| 6,851,062 | B2 | 2/2005 | Hartmann et al. |
| 7,143,180 | B2 * | 11/2006 | Chaar et al. ............ 709/235 |
| 7,613,193 | B2 * | 11/2009 | Swami et al. .......... 370/395.52 |
| 2001/0042200 | A1 | 11/2001 | Lamberton et al. |
| 2002/0103916 | A1 | 8/2002 | Chen et al. |
| 2003/0226032 | A1 * | 12/2003 | Robert .................. 713/200 |
| 2004/0098617 | A1 * | 5/2004 | Sekar ................... 713/201 |
| 2006/0191003 | A1 | 8/2006 | Bahk et al. |

FOREIGN PATENT DOCUMENTS

KR       1020050020002 A    3/2005

OTHER PUBLICATIONS

G. McKinney, "TCP/IP State Transition Diagram (RFC793)," Feb. 23, 2002, 2 pages, Online: [http://www.cs.northwestern.edu/~agupta/cs340/project2/TCPIP_State_Transition_Diagram.pdf].*

(Continued)

*Primary Examiner* — Kaveh Abrishamkar
*Assistant Examiner* — Robert Leung
(74) *Attorney, Agent, or Firm* — The Webb Law Firm (57) ABSTRACT

Disclosed is a method of preventing a denial of service (DoS) attack using transmission control protocol (TCP) state transition. Flow of packets transmitted between a client and a server using TCP is monitored to prevent the DoS attack, e.g., SYN flooding, and to efficiently reduce the load on the server and provide more secure service. By applying the method to a firewall, a proxy server, an intrusion detection system, etc., of a server, it is possible to make up for vulnerabilities regarding a DoS attack without disturbing a conventional TCP state transition operation and detect, verify and block DoS attacks abusing the vulnerabilities, thereby providing more secure service.

13 Claims, 8 Drawing Sheets

(56) References Cited

OTHER PUBLICATIONS

C. Kozierok, "TCP Connection Termination," Sep. 20, 2005, 4 pages, Online: [http://www.tcpipguide.com/free/t_TCPConnection Termination-4.htm].*

R. Sekar, et al. "Specification-based Anomaly Detection: A New Approach for Detecting Network Intrustions," CC'02, Nov. 13-22, 2002.*

Darpa, "Transmission Control Protocol," RFC: 793, Sep. 1981, pp. 34-37.*

Ulrich Ultes-Nitsche, et al. "Run-Time Protocol Conformance Verification in Firewallsm" ISSA, 2004, 11 pages.*

Inseon YOO; "Defence Mechanism Against Vulnerabilities in Network Protocols and Risk Assessment of Data Packets" Thesis No. 1520; Department of Computer Science, University of Fribourg (Switzerland), 2006.

* cited by examiner

Fig. 1

PRIOR ART

METHOD FOR PREVENTING DENIAL OF SERVICE ATTACKS USING TRANSMISSION CONTROL PROTOCOL STATE TRANSITION

TECHNICAL FIELD

The present invention relates to a method of preventing a denial of service (DoS) attack using transmission control protocol (TCP) state transition and, more particularly, to a method of preventing a DoS attack using TCP state transition that efficiently reduces the load on a server and provides safer service by monitoring flow of packets transmitted between a client and the server using TCP to prevent a DoS attack.

BACKGROUND ART

Figure 1:
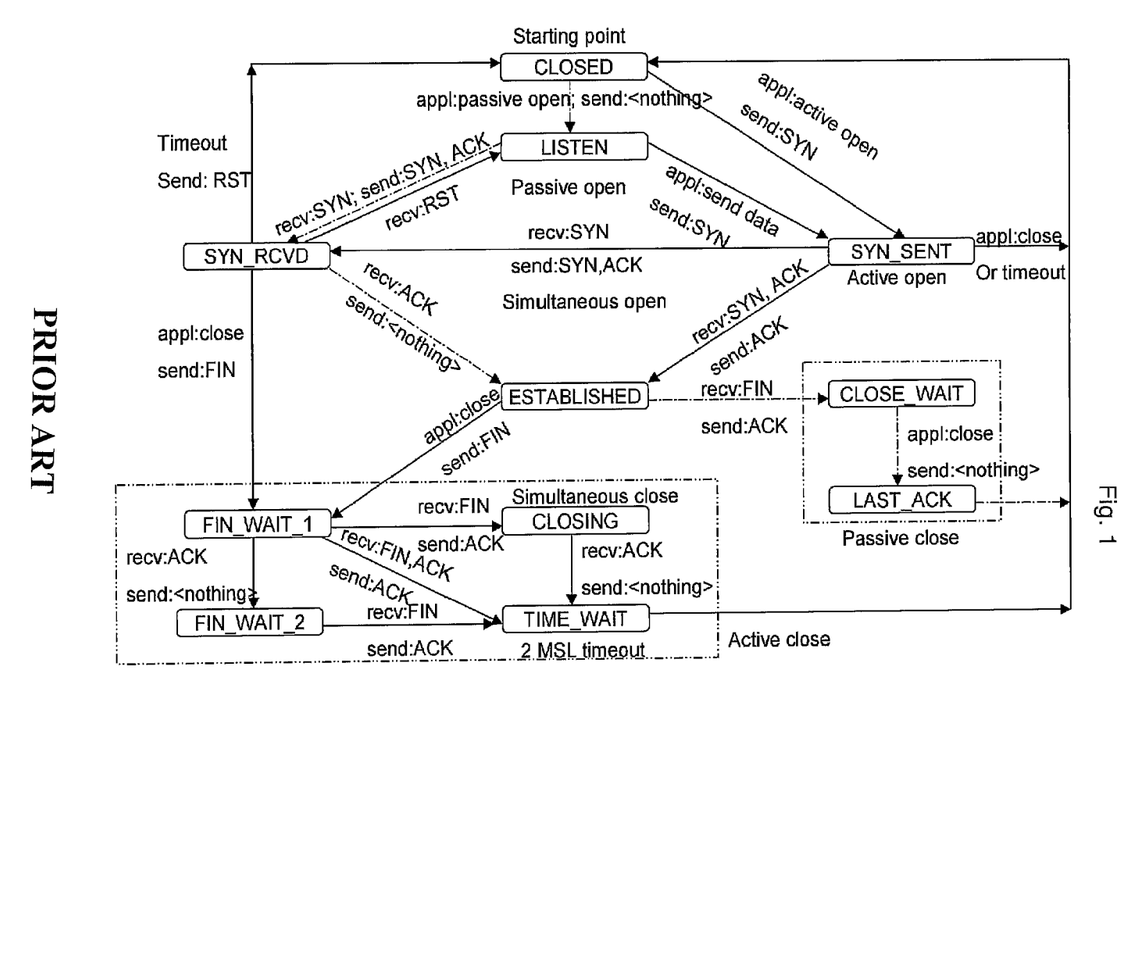
FIG. 1 is a conceptual diagram illustrating a general transmission control protocol (TCP) state transition operation.

FIG. 1 is a conceptual diagram illustrating a general transmission control protocol (TCP) state transition operation, showing an entire standard finite state machine used to better describe TCP for establishing and terminating a TCP connection. In FIG. 1, all states and changes are illustrated for accuracy.

First, TCP connection states are defined as follows:

LISTEN: a state in which a daemon of a server starts up and waits for a connection request;

SYN_SENT: a state in which a local client application has requested connection to a remote host;

SYN_RCVD: a state in which a server received a connection request from a remote client and replied to the client but has not yet received an acknowledgment message from the client;

ESTABLISHED: a state in which a server and a client are connected with each other after three-way handshaking is completed;

FIN_WAIT_1, CLOSE_WAIT, FIN_WAIT_2: states in which a server requests a client to terminate a connection, receives a reply, and thereby terminates the connection;

CLOSING: an uncommon state mainly in which an acknowledgment message is lost during transmission;

TIME_WAIT: a state in which a connection has been terminated but a socket temporarily remains open for slow segments which might have been lost; and CLOSED: a state in which a connection is completely terminated.

According to the connection principle of TCP communication establishing and terminating a TCP connection, a client and a server must go through a three-way handshaking procedure to establish a TCP connection, as defined in previous documents, e.g., Transmission Control Protocol, RFC 793, Jon Postel, DARPA Internet Program Protocol Specification, September 1981.

In other words, for TCP communication between a client and a server, the process of exchanging a connection request (synchronous (SYN)) packet, a connection-request acknowledgment (synchronous/acknowledge (SYN/ACK)) packet, and an acknowledgment (ACK) packet is absolutely necessary.

Here, a successful three-way handshaking procedure of connection request (SYN), connection-request acknowledgment (SYN/ACK), and acknowledgment (ACK) indicates that a TCP connection between a client and a server is established, that is, a TCP communication port of the server requested by the client is open for communication.

However, increase in the number of companies providing services via the Internet has been accompanied by increased attacks abusing the three-way handshaking procedure, e.g., denial of service (DoS) attacks such as SYN flooding attacks.

This will be described with examples. First, when a server receives a finish (FIN) packet in which a FIN flag is set from a malicious client immediately after receiving a SYN packet in which a SYN flag is set, the TCP state of the server directly jumps from the SYN_RCVD state to the CLOSE_WAIT state. For this reason, the server sends an ACK packet, in which an ACK flag corresponding to the FIN packet is set, to the client and waits for an ACK packet of the client in reply to the sent ACK packet.

Second, when a server receives a SYN packet of a client, sends its SYN/ACK packet, in which SYN and ACK flags are set, to the client in order to accept the connection request, and then cannot receive an ACK packet corresponding to the SYN/ACK packet from the client, the server waits in the SYN_RCVD state until the ACK packet is received. In this way, when the malicious client does not complete the procedure after continuously sending the packet to the server, the queue of the server overflows, and thus a DoS event happens.

Third, by a SYN flooding attack, i.e., an attack of continuously sending SYN packets alone from a client, a server continuously waits in the SNC_RCVD state. For this reason, the SYN packets are continuously stacked in the queue of the server. In result, all the queues fill up and the server cannot receive any connection request.

Conventional TCP state transition supports all operations of an operating system (OS) in some cases, and in other cases does not, depending on the configuration of the OS. In particular, a DoS attack such as a SYN flooding attack places a heavy load on a server on service because the server does not perform the checking step of switching to all states suggested in an initial three-way handshaking procedure. Consequently, the server becomes unable to provide service and frequently crashes.

DISCLOSURE OF INVENTION

Technical Problem

The present invention is directed to a method of preventing a denial of service (DoS) attack using transmission control protocol (TCP) state transition, the method efficiently reducing the load on a server and providing a safer service by monitoring flow of packets transmitted between a client and the server using TCP to prevent a DoS attack.

Technical Solution

One aspect of the present invention provides a method of preventing a denial of serve (DoS) attack using transmission control protocol (TCP) state transition by monitoring flow of packets transmitted between a client and a server using TCP, the method comprising the steps of: when the server receives a connection request (SYN) packet of the client, switching a TCP state of the server from a listening (LISTEN) state to a connection-request-received (SYN_RCVD) state; after the server sends a connection-request acknowledgment (SYN/ACK_1) packet to the client, switching the TCP state of the server from the SYN_RCVD state to an acknowledgment-waiting (ACK_WAIT) state; and when an acknowledgment (ACK_2) packet sent from the client and corresponding to the SYN/ACK_1 packet is not received by the server during a previously set timeout period, switching the TCP state of the server from the ACK_WAIT state directly to a closed (CLOSED) state and safely terminating a TCP connection.

Here, the timeout period may be set to 60 seconds.

Another aspect of the present invention provides a method of preventing a denial of serve (DoS) attack using transmission control protocol (TCP) state transition by monitoring flow of packets transmitted between a client and a server using TCP, the method comprising the steps of: when the server receives a SYN packet of the client, switching a TCP state of the server from a LISTEN state to a SYN_RCVD state; after the server sends a SYN/ACK__1 packet to the client, switching the TCP state of the server from the SYN_RCVD state to an ACK_WAIT state; and when the server receives the same SYN packet again, switching the TCP state of the server from the ACK_WAIT state directly to a CLOSED state and safely terminating a TCP connection.

Yet another aspect of the present invention provides a method of preventing a denial of serve (DoS) attack using transmission control protocol (TCP) state transition by monitoring flow of packets transmitted between a client and a server using TCP, the method comprising the steps of: when the server receives a SYN packet of the client, switching a TCP state of the server from a LISTEN state to a SYN_RCVD state; after the server sends a SYN/ACK__1 packet to the client, switching the TCP state of the server from the SYN_RCVD state to an ACK_WAIT state; when the server receives a finish (FIN) packet, sending an ACK__3 packet corresponding to the FIN packet to the client, and then switching the TCP state of the server from the ACK_WAIT state to a preparing-for-close (CLOSING) state; when the server receives an ACK__4 packet sent from the client and corresponding to the ACK__3 packet, switching the TCP state of the server from the CLOSING state to a waiting-for-close (CLOSE_WAIT__1) state; and after the server sends an ACK__5 packet corresponding to the ACK__4 packet to the client, switching the TCP state of the server from the CLOSE_WAIT__1 state to a CLOSED state and safely terminating a TCP connection.

Here, when the ACK__4 packet is not received by the server during a previously set timeout period, the TCP state of the server may be switched from the CLOSING state directly to the CLOSED state and the TCP connection may be safely terminated.

The timeout period may be set to 10 seconds.

Still another aspect of the present invention provides a method of preventing a denial of serve (DoS) attack using transmission control protocol (TCP) state transition by monitoring flow of packets transmitted between a client and a server using TCP, the method comprising the steps of: when the server receives a SYN packet of the client, switching a TCP state of the server from a LISTEN state to a SYN_RCVD state; after the server sends a SYN/ACK__1 packet to the client, switching the TCP state of the server from the SYN_RCVD state to an ACK_WAIT state; when the server receives an acknowledgment finish (ACK__2/FIN) packet from the client, in which an ACK__2 flag corresponding to the SYN/ACK__1 packet and a FIN flag are set, switching the TCP state of the server from the ACK_WAIT state to a waiting-for-close (CLOSE_WAIT__2) state; and when the server receives an abnormal acknowledgment (ACK__6) packet from the client, switching the TCP state of the server from the CLOSE_WAIT__2 state to a CLOSED state and safely terminating a TCP connection.

Here, when the ACK__6 packet is not received by the server during a previously set timeout period, the TCP state of the server may be switched from the CLOSE_WAIT__2 state to the CLOSED state and the TCP connection may be safely terminated.

The timeout period may be set to 10 seconds.

Still yet another aspect of the present invention provides a method of preventing a denial of serve (DoS) attack using transmission control protocol (TCP) state transition by monitoring flow of packets transmitted between a client and a server using TCP, the method comprising the steps of: when the server receives a SYN packet of the client, switching a TCP state of the server from a LISTEN state to a SYN_RCVD state; after the server sends a SYN/ACK__1 packet to the client, switching the TCP state of the server from the SYN_RCVD state to an ACK_WAIT state; when the server receives an ACK__2 packet corresponding to the SYN/ACK__1 packet from the client, switching the TCP state of the server from the ACK_WAIT state to a connection-established (ESTABLISHED) state and establishing a TCP connection; when the server receives a FIN packet of the client, sending an ACK__3 packet corresponding to the FIN packet to the client and then switching the TCP state of the server from the ESTABLISHED state to a CLOSE_WAIT__2 state; and when the server receives an ACK__4 packet corresponding to the ACK__3 packet from the client, switching the TCP state of the server from the CLOSE_WAIT__2 state to a CLOSED state and safely terminating the TCP connection.

Here, when the ACK__4 packet is not received by the server during a previously set timeout period, the TCP state of the server may be switched from the CLOSE_WAIT__2 state to the CLOSED state and the TCP connection may be safely terminated.

The timeout period may be set to 10 seconds.

When the server receives a packet in which a reset (RST) flag or a SYN flag is set from the client after the TCP connection is established, the TCP state of the server may be switched from the ESTABLISHED state directly to the CLOSED state and the TCP connection may be safely terminated.

When no packet is received by the server during a previously set timeout period after the TCP connection is established, the TCP state of the server may be switched from the ESTABLISHED state directly to the CLOSED state and the TCP connection may be safely terminated.

The timeout period may be set to 30 minutes.

Still yet another aspect of the present invention provides a recording medium storing a program for executing the above-described method of preventing a DoS attack using TCP state transition.

Advantageous Effects

According to the inventive method of preventing a denial of service (DoS) attack using transmission control protocol (TCP) state transition, flow of packets transmitted between a client and a server using TCP is monitored to prevent a DoS attack, and thus it is possible to efficiently reduce the load on the server and provide a safer service.

In addition, by applying the inventive method to a firewall, a proxy server, an intrusion detection system, etc., of a server, it is possible to strengthen DoS vulnerabilities without disturbing a conventional TCP state transition operation, and detect, verify and block DoS attacks abusing the vulnerabilities, thereby providing more secure service.

MODE FOR THE INVENTION

Hereinafter, exemplary embodiments of the present invention will be described in detail. However, the present invention is not limited to the embodiments disclosed below, but can be implemented in various forms. The following embodiments are described in order for this disclosure to be complete and enabling to those of ordinary skill in the art.

Figure 2:
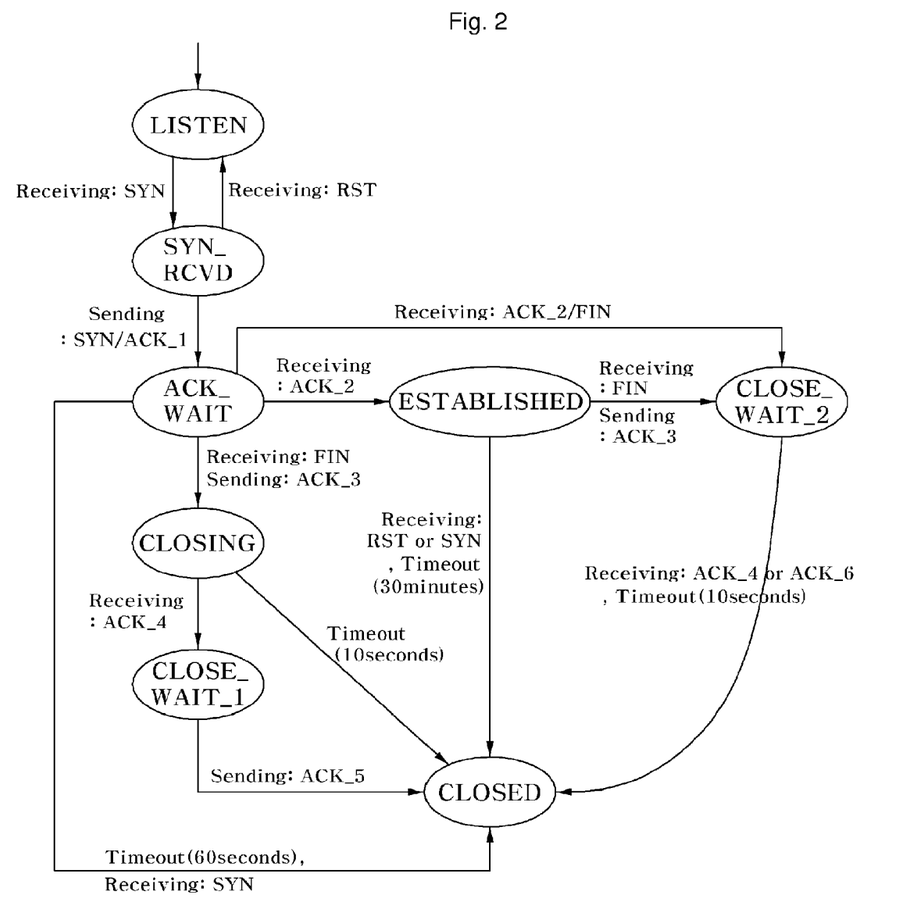
FIG. 2 is a conceptual diagram illustrating a monitoring model for implementing a method of preventing a denial of service (DoS) attack using TCP state transition according to an exemplary embodiment of the present invention.

FIG. 2 is a conceptual diagram illustrating a monitoring model for implementing a method of preventing a denial of service (DoS) attack using transmission control protocol (TCP) state transition according to an exemplary embodiment of the present invention.

Referring to FIG. 2, the monitoring model for implementing a method of preventing a DoS attack using TCP state transition according to an exemplary embodiment of the present invention comprises a listening (LISTEN) state, a connection-request-received (SYN_RCVD) state, an acknowledgment-waiting (ACK_WAIT) state, a connection-established (ESTABLISHED) state, a preparing-for-close (CLOSING) state, waiting-for-close (CLOSE_WAIT_1 and CLOS_WAIT_2) states, and a closed (CLOSD) state, which are connected in various sequences according to flow of packets sent and received between a client and a server.

Here, in an exemplary embodiment of the present invention, the same terms as used in a conventional basic spec of TCP are used for the LISTEN, SYN_RVCD, ESTABLISHED, CLOSING and CLOSED states for convenience. However, the present invention is not limited by use of these terms and other arbitrary terms may be employed instead.

Meanwhile, the monitoring model for implementing a method of preventing a DoS attack using TCP state transition according to an exemplary embodiment of the present invention does not change a conventional basic spec model of TCP but establishes a common connection via TCP between a client and a server. In addition, the monitoring model of the present invention is applied to a firewall, a proxy server, an intrusion detection system, etc., of a server, to monitor flow of packets, check whether a TCP connection between a client 100 and a server 200 is normally established, and safely terminate the TCP connection when an abnormal connection, e.g., a DoS attack such as a SYN flooding attack, is attempted. Consequently, the monitoring model can strengthen DoS vulnerabilities without disturbing TCP state transition operations according to the conventional basic spec of TCP, and can also detect, verify and block DoS attacks abusing the vulnerabilities, thereby providing more secure service.

In other words, while monitoring packets exchanged between a client and a server, the monitoring model applied in an exemplary embodiment of the present invention checks and determines whether or not the packets exchanged while switching respective TCP connection states conform to the TCP spec.

In addition, when a client attempts to establish a new session with a server, the monitoring model applied in an exemplary embodiment of the present invention sets up new sessions in an initial state, checks tags of packets while reading the packets, and when the verification result of a tag is invalid, terminates the session or the connection state. Besides, the monitoring model checks response packets sent from the server to the client and continuously monitors flow of exchanged packets while switching to a next connection state.

Figure 3:
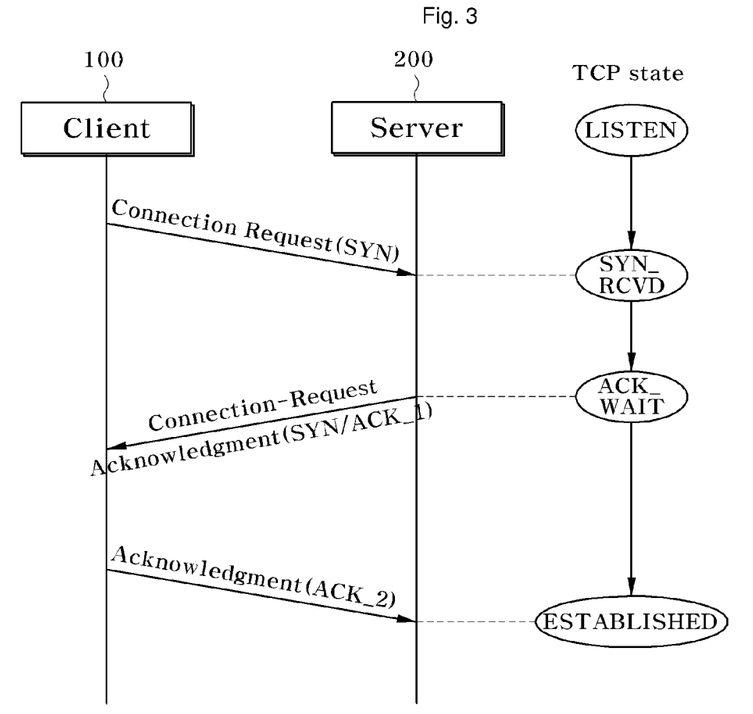
FIG. 3 illustrates packet flow and TCP state transition operations applied in an exemplary embodiment of the present invention in a normal TCP connection establishment process between a client and a server.

FIG. 3 illustrates packet flow and TCP state transition operations applied in an exemplary embodiment of the present invention in a normal TCP connection establishment process between a client and a server.

Referring to FIGS. 2 and 3, when a session is initially established between the client 100 and the server 200, the TCP state of the server 200 is set to the LISTEN state that is the initial TCP connection state of the present invention.

Then, the client 100 sends a connection request (SYN) packet, in which a SYN flag is set, to a specific port of the server 200 to which the client wants to connect. When the server 200 checks that the SYN packet sent from the client 100 is received, the TCP state of the server 200 is switched from the LISTEN state to the SYN_RCVD state.

Subsequently, to accept the connection request, the server 200 sends its connection-request acknowledgment (SYN/ACK_1) packet, in which SYN and acknowledgment (ACK_1) flags are set, to the client 100. When the server 200 checks that the SYN/ACK_1 packet is sent to the client 100, the TCP state of the server 200 is switched from the SYN_RCVD state to the ACK_WAIT state.

Subsequently, the client 100 sends an ACK_2 packet corresponding to the SYN/ACK_1 packet to the server 200. When the server 200 checks that the ACK_2 packet sent from the client 100 is received, the TCP state of the server 200 is switched from the ACK_WAIT state to the ESTABLISHED state, thereby establishing a TCP connection. After this, data is freely transmitted between the client 100 and the server 200.

Figure 4:
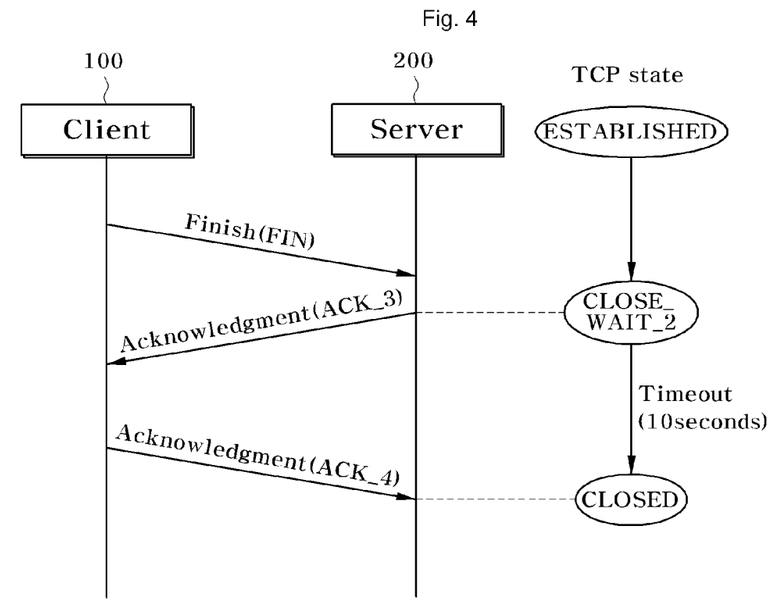
FIG. 4 illustrates packet flow and TCP state transition operations applied in an exemplary embodiment of the present invention in a normal TCP connection termination process between a client and a server.

FIG. 4 illustrates packet flow and TCP state transition operations applied in an exemplary embodiment of the present invention in a normal TCP connection termination process between a client and a server.

Referring to FIGS. 2 and 4, in order to terminate a TCP connection in the ESTABLISHED state in which the TCP connection is established between the client 100 and the server 200, the client 100 sends a finish (FIN) packet, in which a FIN flag is set, to a specific port of the server 20. When the sever 200 receives the FIN packet sent from the client 100, it sends an ACK_3 packet corresponding to the FIN packet to the client 100 in order to acknowledge termination of the TCP connection.

Here, when the server 200 checks that the ACK__3 packet corresponding to the FIN packet is sent to the client 100, the TCP state of the sever 200 is switched from the ESTABLISHED state to the CLOSE_WAIT__2 state.

Then, the client 100 sends an ACK__4 packet corresponding to the ACK__3 packet to the server 200. When the server 200 checks that the ACK__4 packet sent from the client 100 is received, the TCP state of the server 200 is switched from the CLOSE_WAIT__2 state to the CLOSED state, thereby terminating the TCP connection.

Meanwhile, when the client 100 does not send the ACK__4 packet and terminates the connection beforehand in the CLOSE_WAIT__2 state, a timeout occurs and the server 200 enters the CLOSED state to terminate the TCP connection.

More specifically, when the ACK__4 packet is not received by the server 200 during a previously set timeout period, which may be about 10 seconds, the TCP state of the server 200 is switched from the CLOSE_WAIT__2 state to the CLOSED state, thereby safely terminating the TCP connection.

Figure 5:
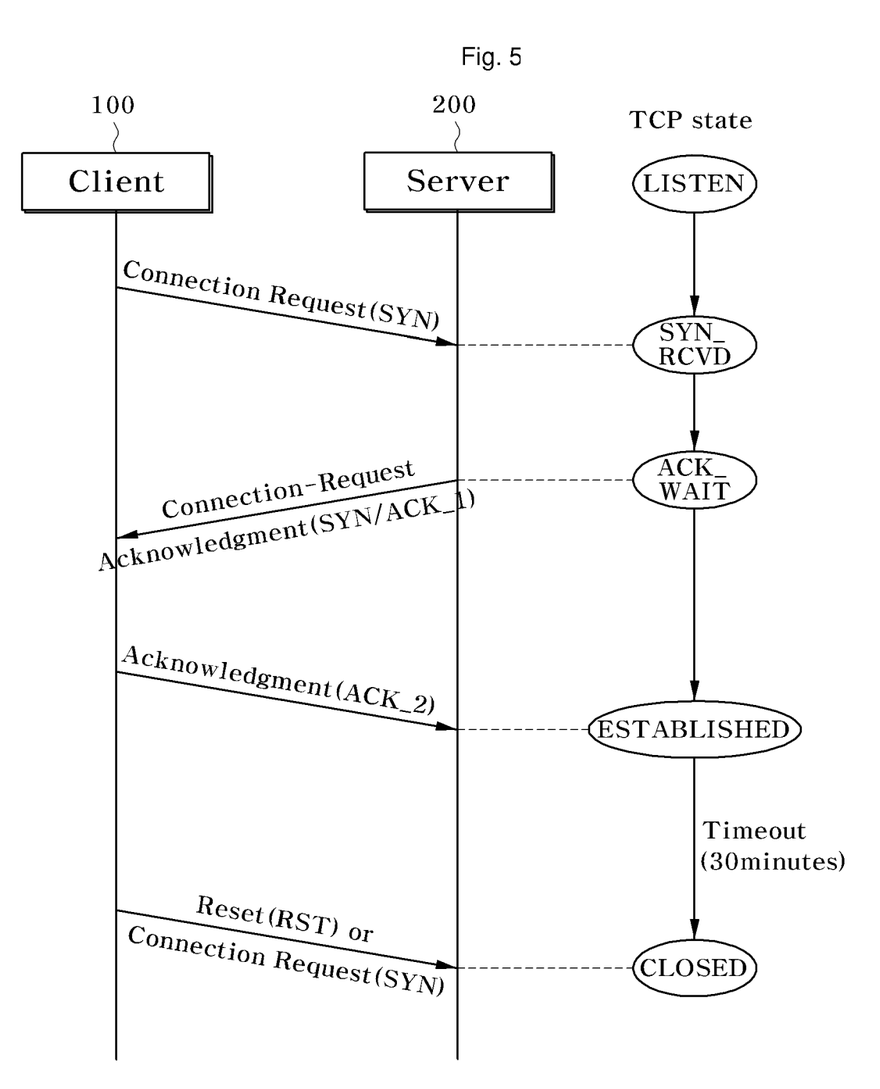
FIG. 5 illustrates packet flow and TCP state transition operations applied in an exemplary embodiment of the present invention according to a first example of an abnormal TCP connection.

The method of preventing a DoS attack using TCP state transition according to an exemplary embodiment of the present invention will be described in detail below with reference to various examples of abnormal TCP connections FIG. 5 illustrates packet flow and TCP state transition operations applied in an exemplary embodiment of the present invention according to a first example of an abnormal TCP connection.

Referring to FIGS. 2 and 5, when the server 200 checks that a SYN packet sent from the client 100 is received, the TCP state of the server 200 is switched from the LISTEN state to the SYN_RCVD state. Then, when the server 200 checks that a SYN/ACK__1 packet is sent to the client 100, the TCP state of the server 200 is switched from the SYN_RCVD state to the ACK_WAIT state.

Subsequently, when the server 200 checks that an ACK__2 packet sent from the client 100 is received, the TCP state of the server 200 is switched from the ACK_WAIT state to the ESTABLISHED state, thereby establishing a TCP connection.

Afterwards, when the server 200 checks that a packet, in which a reset (RST) or SYN flag is set, sent from the client 100 is received, the TCP state of the server 200 is switched from the ESTABLISHED state directly to the CLOSED state, thereby safely terminating the TCP connection.

Meanwhile, when the client 100 abnormally terminates the connection without sending any packet in the ESTABLISHED state, a timeout occurs and the server 200 directly enters the CLOSED state to terminate the TCP connection.

More specifically, when no packet is received by the server 200 during a previously set timeout period, which may be about 30 minutes, the TCP state of the server 200 is switched from the ESTABLISHED state directly to the CLOSED state, thereby safely terminating the TCP connection.

Figure 6:
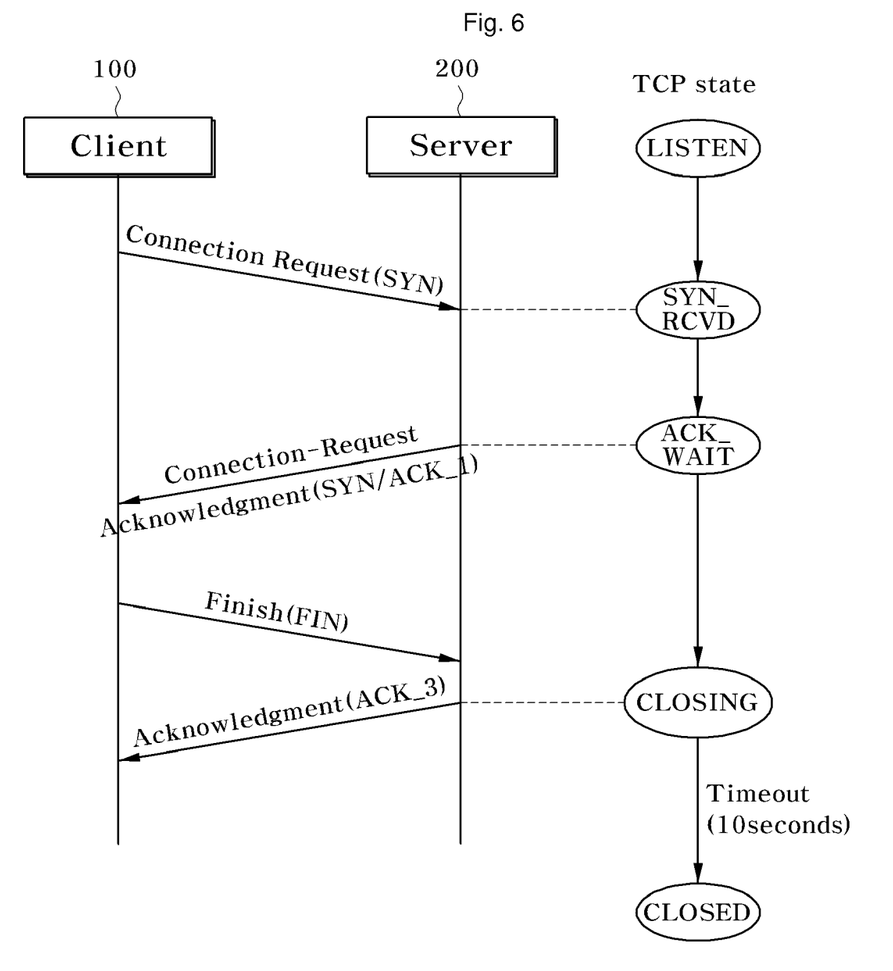
FIG. 6 illustrates packet flow and TCP state transition operations applied in an exemplary embodiment of the present invention according to a second example of an abnormal TCP connection.

FIG. 6 illustrates packet flow and TCP state transition operations applied in an exemplary embodiment of the present invention according to a second example of an abnormal TCP connection.

Referring to FIGS. 2 and 6, when the server 200 checks that a SYN packet sent from the client 100 is received, the TCP state of the server 200 is switched from the LISTEN state to the SYN_RCVD state. Then, when the server 200 checks that a SYN/ACK__1 packet is sent to the client 100, the TCP state of the server 200 is switched from the SYN_RCVD state to the ACK_WAIT state.

Subsequently, when the server 200 receives a FIN packet sent from the client 100 and checks that an ACK__3 packet corresponding to the FIN packet is sent to the client 100, the TCP state of the server 200 is switched from the ACK_WAIT state to the CLOSING state, thereby preparing to safely terminate the corresponding session.

Here, when the client 100 abnormally terminates the connection without sending any packet in the CLOSING state, a timeout occurs and the server 200 directly enters the CLOSED state to terminate the TCP connection.

More specifically, when no packet is received by the server 200 during a previously set timeout period, which may be about 10 seconds, the TCP state of the server 200 is switched from the CLOSING state directly to the CLOSED state, thereby safely terminating the TCP connection.

Figure 7:
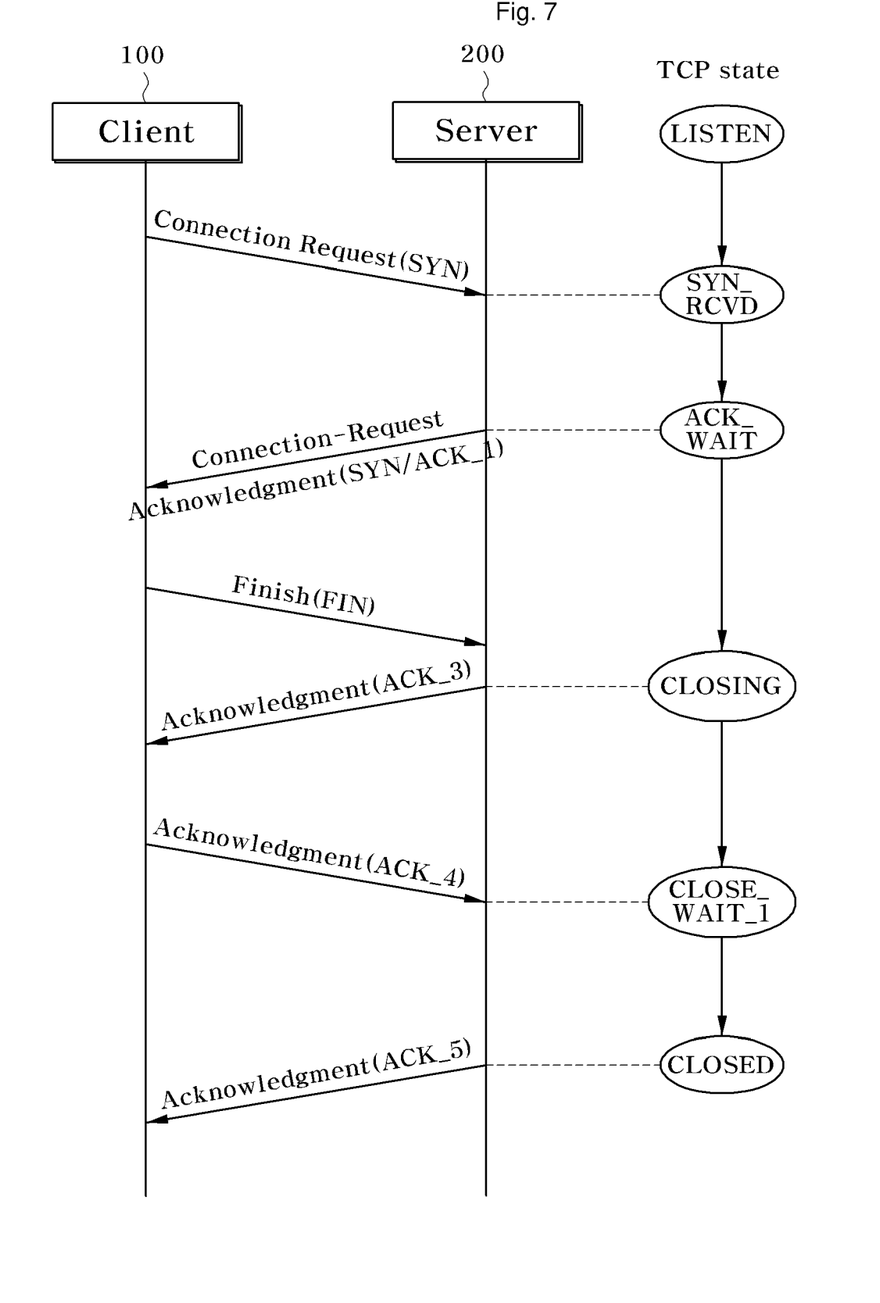
FIG. 7 illustrates packet flow and TCP state transition operations applied in an exemplary embodiment of the present invention according to a third example of an abnormal TCP connection.

FIG. 7 illustrates packet flow and TCP state transition operations applied in an exemplary embodiment of the present invention according to a third example of an abnormal TCP connection.

Referring to FIGS. 2 and 7, when the server 200 checks that a SYN packet sent from the client 100 is received, the TCP state of the server 200 is switched from the LISTEN state to the SYN_RCVD state. Then, when the server 200 checks that a SYN/ACK__1 packet is sent to the client 100, the TCP state of the server 200 is switched from the SYN_RCVD state to the ACK_WAIT state.

Subsequently, when the server 200 receives a FIN packet sent from the client 100 and checks that an ACK__3 packet corresponding to the FIN packet is sent to the client 100, the TCP state of the server 200 is switched from the ACK_WAIT state to the CLOSING state, thereby preparing to safely terminate the corresponding session.

Then, when the server 200 checks that an ACK__4 packet sent from the client 100 and corresponding to the ACK__3 packet is received, the TCP state of the server 200 is switched from the CLOSING state to the CLOSE_WAIT__1 state.

Subsequently, when the server 200 checks that an ACK__5 packet corresponding to the ACK__4 packet is sent to the client 100, the TCP state of the server 200 is switched from the CLOSE_WAIT__1 state to the CLOSED state, thereby safely terminating the TCP connection.

Figure 8:
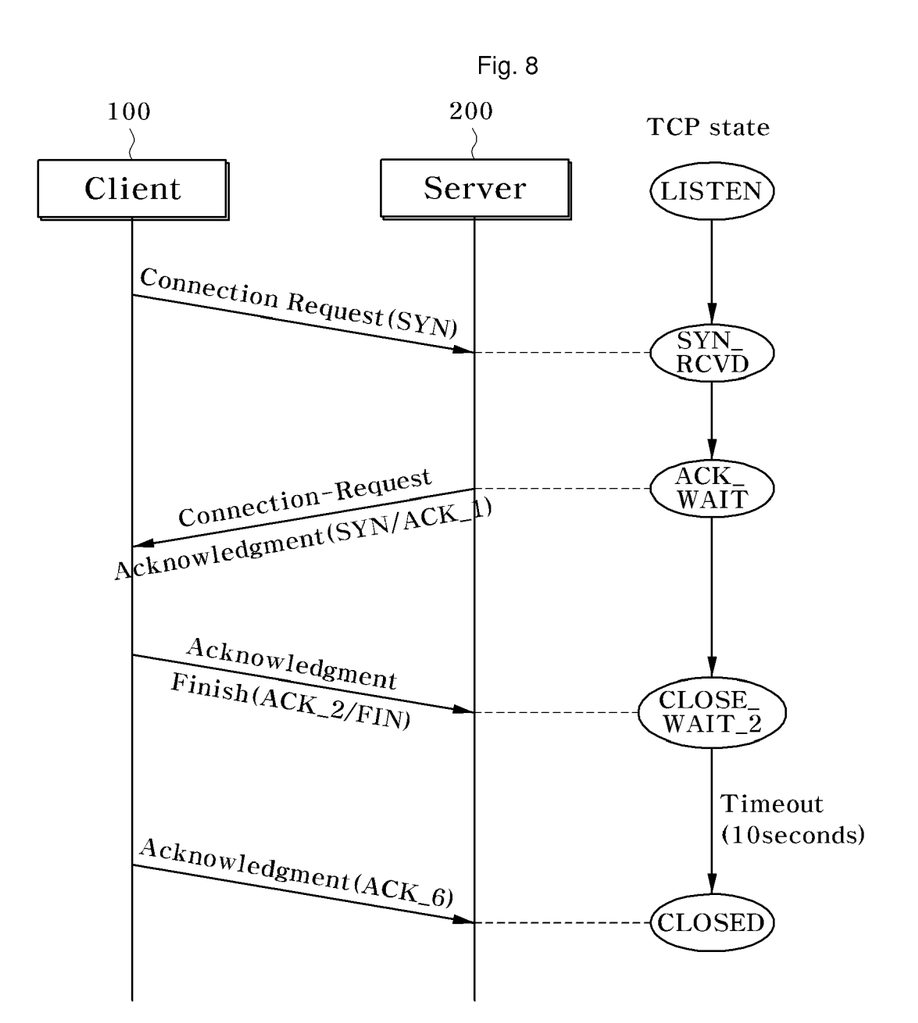
FIG. 8 illustrates packet flow and TCP state transition operations applied in an exemplary embodiment of the present invention according to a fourth example of an abnormal TCP connection.

FIG. 8 illustrates packet flow and TCP state transition operations applied in an exemplary embodiment of the present invention according to a fourth example of an abnormal TCP connection.

Referring to FIGS. 2 and 8, when the server 200 checks that a SYN packet sent from the client 100 is received, the TCP state of the server 200 is switched from the LISTEN state to the SYN_RCVD state. Then, when the server 200 checks that a SYN/ACK__1 packet is sent to the client 100, the TCP state of the server 200 is switched from the SYN_RCVD state to the ACK_WAIT state.

Subsequently, when the client 100 sends an acknowledgment finish (ACK__2/FIN) packet, in which an ACK__2 flag corresponding to the SYN/ACK__1 packet and a FIN flag are set, to the server 200, and the server 200 checks that the ACK__2/FIN packet sent from the client 100 is received, the TCP state of the server 200 is switched from the ACK_WAIT state to the CLOSE_WAIT__2 state.

Afterwards, when the server 200 checks that an abnormal ACK__6 packet, i.e., an acknowledgment packet not conforming to a normal packet flow and intentionally sent by a malicious client, is received from the client 100, the TCP state of the server 200 is switched from the CLOSE_WAIT__2 state to the CLOSED state.

Meanwhile, when the client 100 terminates the connection without sending any packet including the abnormal ACK__6 packet in the CLOSE_WAIT_2 state, a timeout occurs and the server 200 directly enters the CLOSED state to terminate the TCP connection.

More specifically, when no packet is received by the server 200 during a previously set timeout period, which may be about 10 seconds, the TCP state of the server 200 is switched from the CLOSE_WAIT_2 state to the CLOSED state, thereby safely terminating the TCP connection.

Figure 9:
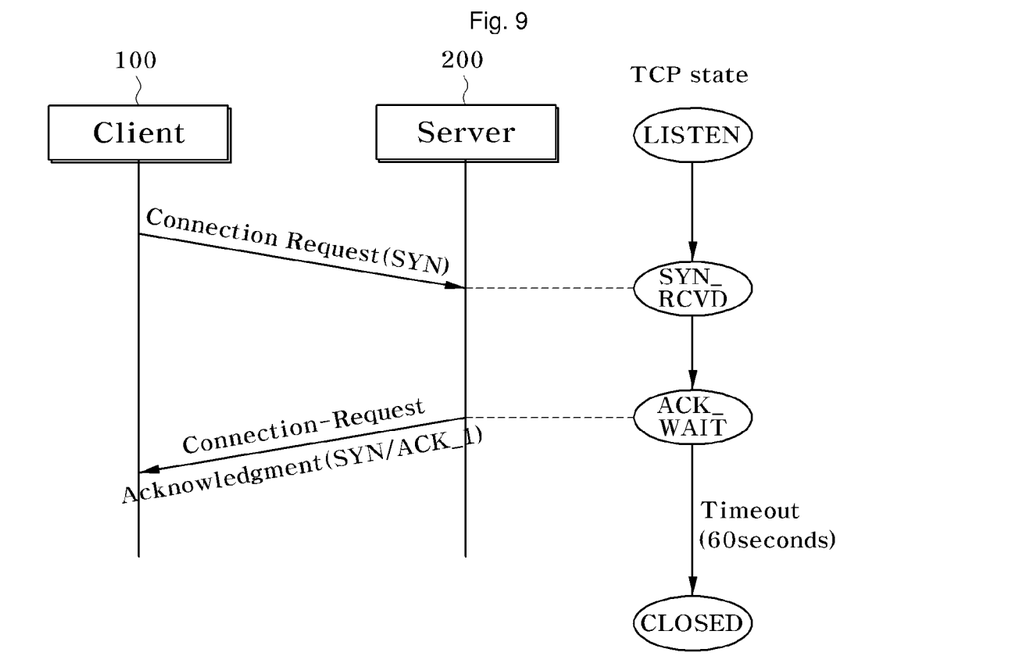
FIG. 9 illustrates packet flow and TCP state transition operations applied in an exemplary embodiment of the present invention according to a fifth example of an abnormal TCP connection.

FIG. 9 illustrates packet flow and TCP state transition operations applied in an exemplary embodiment of the present invention according to a fifth example of an abnormal TCP connection.

Referring to FIGS. 2 and 9, when the server 200 checks that a SYN packet sent from the client 100 is received, the TCP state of the server 200 is switched from the LISTEN state to the SYN_RCVD state. Then, when the server 200 checks that a SYN/ACK_1 packet is sent to the client 100, the TCP state of the server 200 is switched from the SYN_RCVD state to the ACK_WAIT state.

When the client 100 abnormally terminates the connection without sending any packet in the ACK_WAIT state, a timeout occurs and the server 200 directly enters the CLOSED state to terminate the TCP connection.

More specifically, when no packet is received by the server 200 during a previously set timeout period, which may be about 60 seconds, the TCP state of the server 200 is switched from the ACK_WAIT state directly to the CLOSED state, thereby safely terminating the TCP connection.

Figure 10:
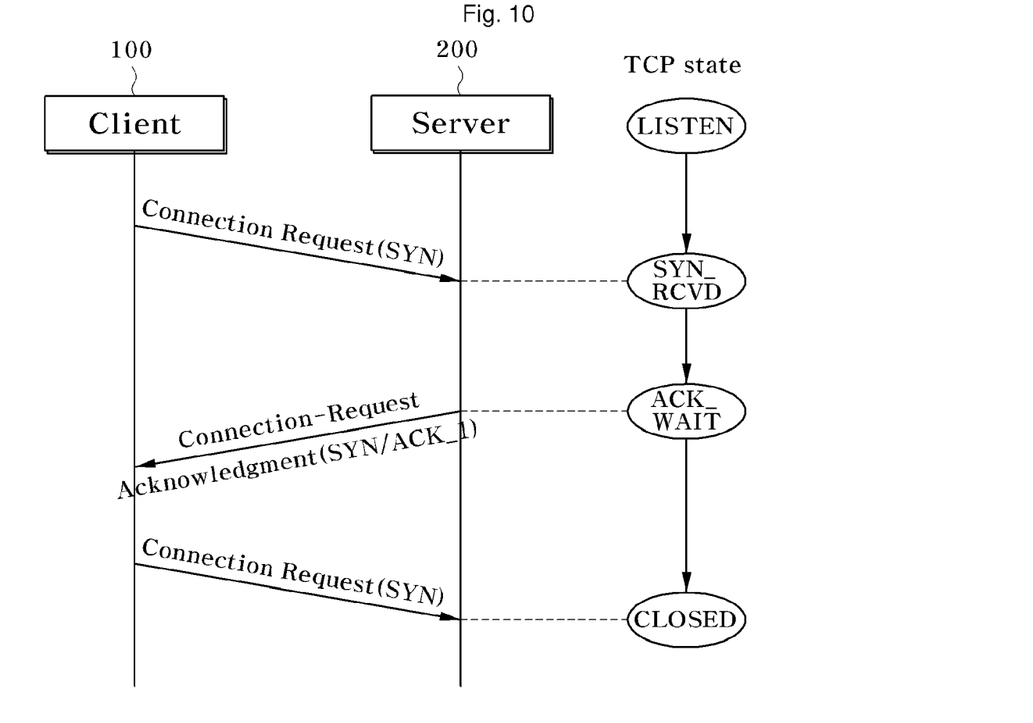
FIG. 10 illustrates packet flow and TCP state transition operations applied in an exemplary embodiment of the present invention according to a sixth example of an abnormal TCP connection.

FIG. 10 illustrates packet flow and TCP state transition operations applied in an exemplary embodiment of the present invention according to a sixth example of an abnormal TCP connection.

Referring to FIGS. 2 and 10, when the server 200 checks that a SYN packet sent from the client 100 is received, the TCP state of the server 200 is switched from the LISTEN state to the SYN_RCVD state. Then, when the server 200 checks that a SYN/ACK_1 packet is sent to the client 100, the TCP state of the server 200 is switched from the SYN_RCVD state to the ACK_WAIT state.

When the client 100 continuously sends the same SYN packet in the ACK_WAIT state, and the server 200 checks receipt of the SYN packets sent from the same client 100, the TCP state of the server 200 is switched from the ACK_WAIT state directly to the CLOSED state, thereby safely terminating the TCP connection.

As described above, the monitoring model for implementing a method of preventing a DoS attack using TCP state transition according to an exemplary embodiment of the present invention checks and prevents DoS events from happening due to continuous overflow of a queue according to the conventional TCP spec, thereby efficiently preventing DoS attacks in an early stage.

Meanwhile, the method of preventing a DoS attack using TCP state transition according to an exemplary embodiment of the present invention can be stored on a computer-readable recording medium in the form of computer code. The computer-readable recording medium may be any recording device storing data that can be read by computer systems.

For example, the computer-readable recording medium may be a read-only memory (ROM), a random-access memory (RAM), a compact disk read-only memory (CD-ROM), a magnetic tape, a hard disk, a floppy disk, a mobile storage device, a nonvolatile memory (flash memory), an optical data storage device, and so on. Also, the recording medium may be carrier waves, e.g., transmission over the Internet.

In addition, the computer-readable recording medium may be distributed among computer systems connected via a communication network and stored in the form of a code that can be read and executed by a de-centralized method.

While the invention has been shown and described with reference to a certain exemplary embodiment of a method of preventing a DoS attack using TCP state transition, it will be understood by those skilled in the art that various changes in form and details may be made therein without departing from the spirit and scope of the invention as defined by the appended claims.

The invention claimed is:

1. A method of preventing a denial of service (DoS) attack using transmission control protocol (TCP) state transition by monitoring flow of packets transmitted between a client and a server using TCP, the method comprising the steps of:

when the server receives a connection request (SYN) packet of the client, switching a TCP state of the server from a listening (LISTEN) state to a connection-request-received (SYN_RCVD) state; and after the server sends a connection-request acknowledgment (SYN/ACK_1) packet to the client, switching the TCP state of the server from the SYN_RCVD state to an acknowledgment-waiting (ACK_WAIT) state;

wherein, if the server receives the same SYN packet again in the ACK_WAIT state, the TCP state of the server is switched from the ACK_WAIT state directly to a closed (CLOSED) state and safely terminating a TCP connection, wherein, if the server receives a finish (FIN) packet in the ACK_WAIT state, the server sends an acknowledgement (ACK_3) packet corresponding to the FIN packet to the client, and then the TCP state of the server is switched from the ACK_WAIT state to a preparing-for-close (CLOSING) state, and wherein if the server does not receive an packets during a previously set timeout period in the CLOSING state, the TCP state of the server is switched from the CLOSING state directly to the CLOSED state, and the TCP connection is safely terminated.

2. The method of claim 1, wherein, if the server receives an ACK_4 packet corresponding to the ACK_3 packet from the client in the CLOSING state, the TCP state of the server is switched from the CLOSING state to a waiting-for-close (CLOSE_WAIT_I) state; and wherein, after the server sends an ACK_5 packet corresponding to the ACK_4 packet to the client, the TCP state of the server is switched from the CLOSE_WAIT_I state to a closed (CLOSED) state and safely terminating a TCP connection.

3. The method of claim 1, wherein the timeout period is set to 10 seconds.

4. The method of claim 1, further comprising:

after the step of switching the TCP state of the server from the SYN_RCVD state to the ACK_WAIT state, when the server receives an acknowledgment finish (ACK_2/FIN) packet from the client, in which an ACK_2 flag corresponding to the SYN/ACK_I packet and a FIN flag are set, switching the TCP state of the server from the ACK_WAIT state to a waiting-for-close (CLOSE_WAIT_2) state; and when the server receives an abnormal acknowledgment (ACK_6) packet from the client, switching the TCP state of the server from the CLOSE_WAIT_2 state to a closed (CLOSED) state and safely terminating a TCP connection.

5. The method of claim 4, wherein when the ACK_6 packet is not received by the server during a previously set timeout period, the TCP state of the server is switched from the CLOSE_WAIT_2 state to the CLOSED state, and the TCP connection is safely terminated.

6. The method of claim 5, wherein the timeout period is set to 10 seconds.

7. The method of claim 2, further comprising:
after the step of switching the TCP state of the server from the SYN_RCVD state to the ACK_WAIT state, when the server receives an acknowledgment (ACK_2) packet corresponding to the SYN/ACK_1 packet from the client, switching the TCP state of the server from the ACK_WAIT state to a connection-established (ESTABLISHED) state and establishing a TCP connection;
when the server receives a finish (FIN) packet of the client, sending an ACK_3 packet corresponding to the FIN packet to the client and then switching the TCP state of the server from the ESTABLISHED state to a waiting-for-close (CLOSE_WAIT_2) state; and
when the server receives an ACK_4 packet corresponding to the ACK_3 packet from the client, switching the TCP state of the server from the CLOSE_WAIT_2 state to a closed (CLOSED) state and safely terminating the TCP connection.

8. The method of claim 7, wherein when the ACK_4 packet is not received by the server during a previously set timeout period, the TCP state of the server is switched from the CLOSE_WAIT_2 state to the CLOSED state, and the TCP connection is safely terminated.

9. The method of claim 8, wherein the timeout period is set to 10 seconds.

10. The method of claim 7, wherein when the server receives a packet in which a reset (RST) flag or a SYN flag is set from the client after the TCP connection is established, the TCP state of the server is switched from the ESTABLISHED state directly to the CLOSED state, and the TCP connection is safely terminated.

11. The method of claim 7, wherein when no packet is received by the server during a previously set timeout period after the TCP connection is established, the TCP state of the server is switched from the ESTABLISHED state directly to the CLOSED state, and the TCP connection is safely terminated.

12. The method of claim 11, wherein the timeout period is set to 30 minutes.

13. A non-transitory computer-readable recording medium storing a program capable of executing the method of claim 1.

* * * * *